(12) United States Patent
Hines (10) Patent No.: US 9,596,395 B1
(45) Date of Patent: Mar. 14, 2017

(54) CAMERA FRAMING LIGHT

(71) Applicant: Stephen P Hines, Glendale, CA (US)

(72) Inventor: Stephen P Hines, Glendale, CA (US)

( * ) Notice: Subject to any disclaimer, the term of this patent is extended or adjusted under 35 U.S.C. 154(b) by 0 days.

(21) Appl. No.: 14/709,228

(22) Filed: May 11, 2015

(51) Int. Cl.
*H04N 5/225* (2006.01)
*F21V 33/00* (2006.01)
*G02B 27/10* (2006.01)
*F21V 14/02* (2006.01)

(52) U.S. Cl.
CPC ........... *H04N 5/2256* (2013.01); *F21V 14/02* (2013.01); *F21V 33/0052* (2013.01); *G02B 27/10* (2013.01); *H04N 5/2254* (2013.01); *F21Y 2115/30* (2016.08)

(58) Field of Classification Search
CPC .... H04N 5/2256; H04N 5/2254; F21V 14/02; F21V 33/0052; G02B 27/10; F21Y 2115/30
See application file for complete search history.

(56) References Cited

U.S. PATENT DOCUMENTS

| | | | | |
|---|---|---|---|---|
| 3,914,544 | A * | 10/1975 | Watanabe | H04N 5/90 348/97 |
| 3,952,319 | A * | 4/1976 | Hirata | G03B 7/085 352/93 |
| 7,176,967 | B1 * | 2/2007 | Dykaar | H04N 5/2254 348/262 |
| 7,202,891 | B1 * | 4/2007 | Ingram | H04N 5/2254 348/224.1 |

* cited by examiner

*Primary Examiner* — Mary Ellen Bowman
(74) *Attorney, Agent, or Firm* — Roy L Anderson (57) ABSTRACT

A framing light uses horizontal and vertical framing-light assemblies in which two opposite framing lines of a projected frame are projected from a single light source by use of a beamsplitter, a line emitting laser diode and an angular adjustment which adjusts a spread angle by swinging the light emitting laser diode around a beamsplitter while the beamsplitter is stationary.

19 Claims, 7 Drawing Sheets

CAMERA FRAMING LIGHT

FIELD OF THE INVENTION

The present invention is in the field of photography and, more particularly, in the field of framing devices used in photography.

BACKGROUND OF THE INVENTION

The present invention provides a timesaving device for photographers to provide an alternate to the traditional optical viewfinder or LCD screen on the back of a camera.

Currently, for example, commercial photographers setting up for a product shot or advertising layout for a fashion magazine carefully compose the shot to position the product or model, and make adjustments to the scene by excluding light stands and unwanted backgrounds. When working alone, this can require many adjustments in front of the camera, and many trips back behind the camera to check the composition using the viewfinder or the LCD screen.

The same advantages apply to video photographers. If adjustments to the scene need to be made, for example to bring an object into the field of view, or to move light stands or microphone boom out of the scene, they have to go back to the camera viewfinder to confirm that the changes were made, being inside or outside the lens' field of view.

SUMMARY OF THE INVENTION

The present invention is generally directed to use of a framing light, especially horizontal and vertical framing-light assemblies, in which two opposite framing lines of a projected frame are projected from a single light source by use of a beamsplitter, a line emitting laser diode and an angular adjustment which adjusts a spread angle by swinging the light emitting laser diode around a stationary beamsplitter.

The framing-light assemblies can be integral with a camera, such as in a lens barrel or adjacent to the lens, or detachable from the camera (e.g., accessories) and the projected frame can be positioned proximate to, but outside of, the field of view of the camera lens, or be coexistent with the field of view. The projected frame can be adjusted to the field of view or aspect ratio of the camera lens and corrected for parallax error (if need be).

Accordingly, it is a primary object of the present invention to provide improved camera framing.

This and further objects and advantages will be apparent to those skilled in the art in connection with the drawings and the detailed description of the preferred embodiment set forth below.

BRIEF DESCRIPTION OF THE DRAWINGS

FIGS. 3 and 4 illustrate integration of two framing light assemblies (one horizontal, one vertical) into the rim of a camera lens barrel in accordance with the present invention while

DETAILED DESCRIPTION OF THE INVENTION

In the Figures and the following more detailed description, numerals indicate various features of the invention, with like numerals referring to like features throughout both the drawings and the description.

Although the Figures are described in greater detail below, the following is a glossary of the elements identified in the Figures.

Glossary

AH Attachment Holes
AP Adapter Plate
AK Angle-Adjustment Knob
BS Beamsplitter
CAM Camera
CCF Camera-Cage Frame
CIS Camera-Image Sensor
CL Camera Lens
CLCL Camera-Lens Center Line
EL Emitted Light
EP Entrance Pupil
F Frame
FD Focus Distance
FLA Framing Light Assembly
FLCL Framing-Light Assembly Center Line
FLA-H Framing-Light Assembly Horizontal Orientation
FLA-V Framing-Light Assembly Vertical Orientation
FP Framing Projector
ISCL Image-Sensor Center Line
LAA Laser-Adjustment Angle
LCL Laser Center Line
LD Laser Diode
LDA Laser-Diode Array
LP Laser Pivot
LPL Laser Projection Lens
LR Lens Rim
PF Projected Frame
PFL Projected Framing Line
PLL Projected Line of Light
PRML Perimeter Lights
RLB Reflected Light Beam
SA Spread Angle
SA-H Spread Angle-Horizontal
SA-V Spread Angle-Vertical
SL Slot
TL Transmitted Line
V Vertex The present invention generally discloses a number of concepts in which a framing light is used to optically project frame edges into a scene using laser diodes (the light source in laser pointers) or other suitable light sources.

Figure 1:
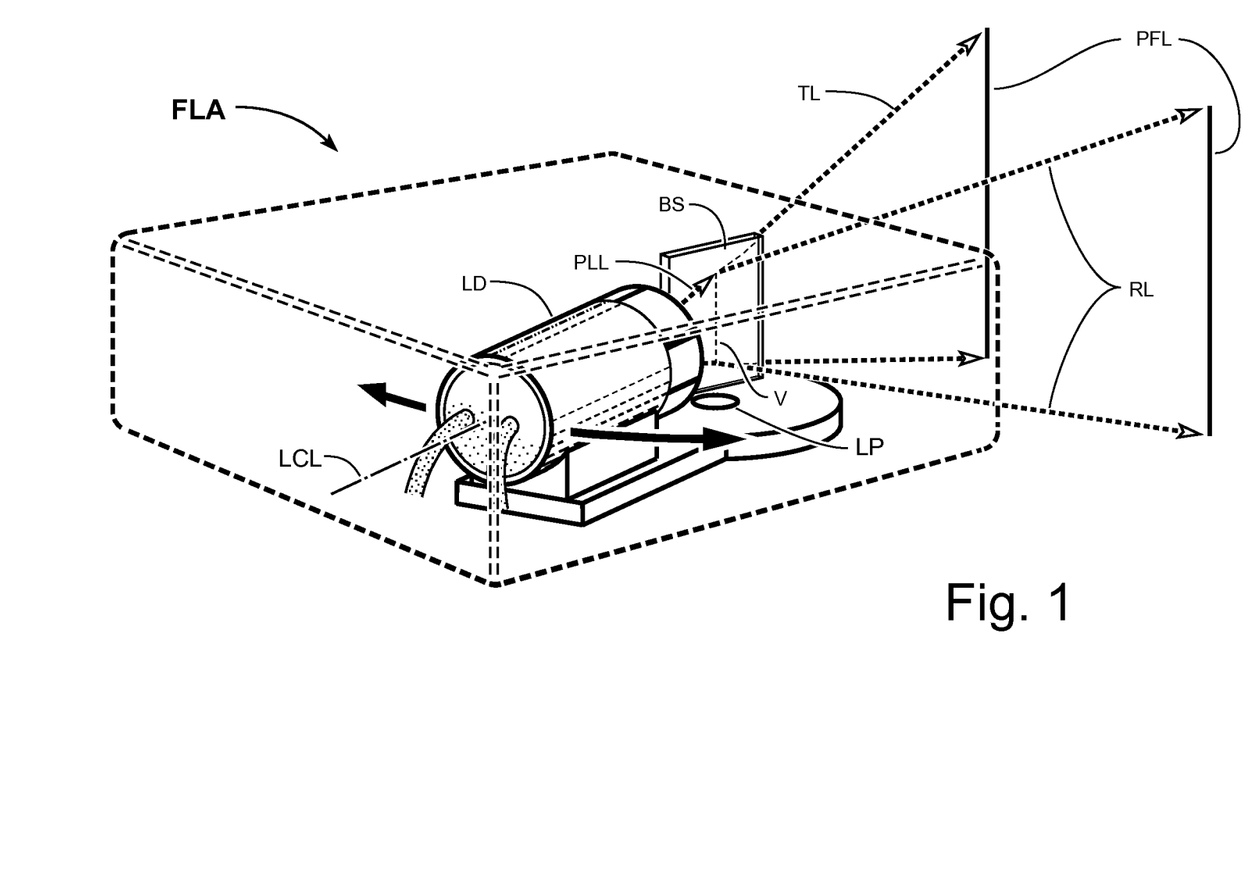
FIG. 1 illustrates use of a framing light assembly in accordance with the present invention to optically project the frame edges into a scene using a laser diode.
Figure 2A:
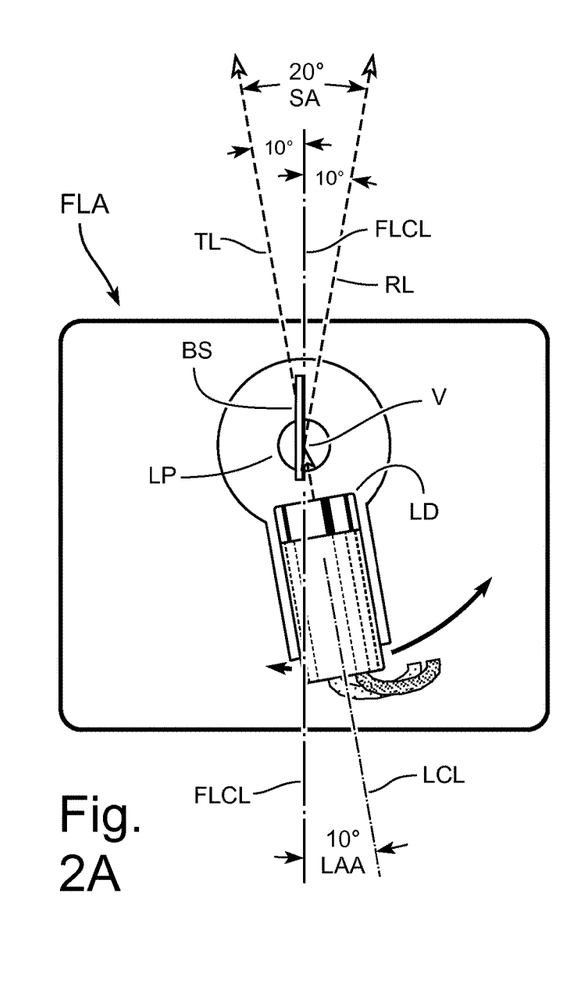
FIGS. 2A and 2B are top views that illustrate use of a beam-splitter mounted parallel to the framing-light center line of the framing light assembly of FIG. 1.
Figure 2B:
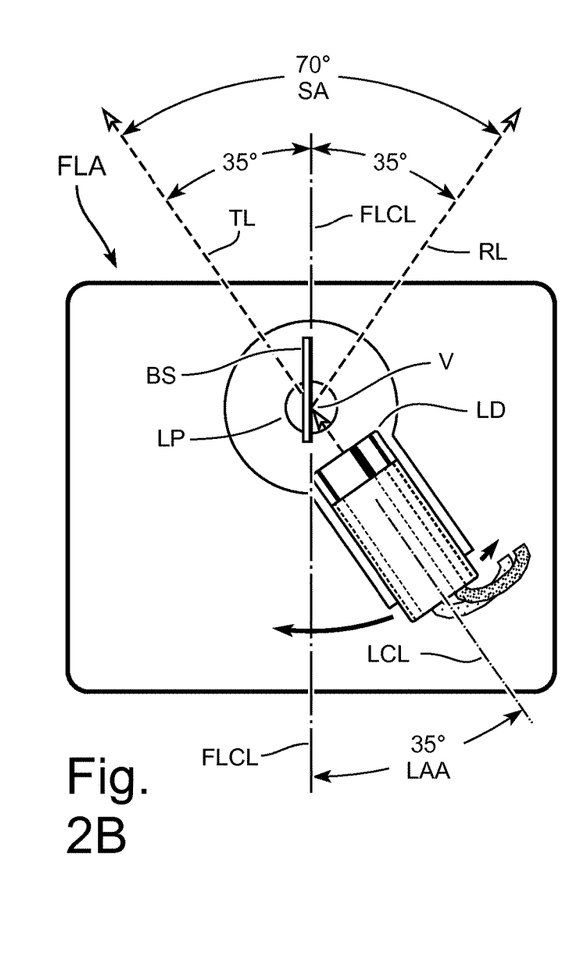
Figure 3:
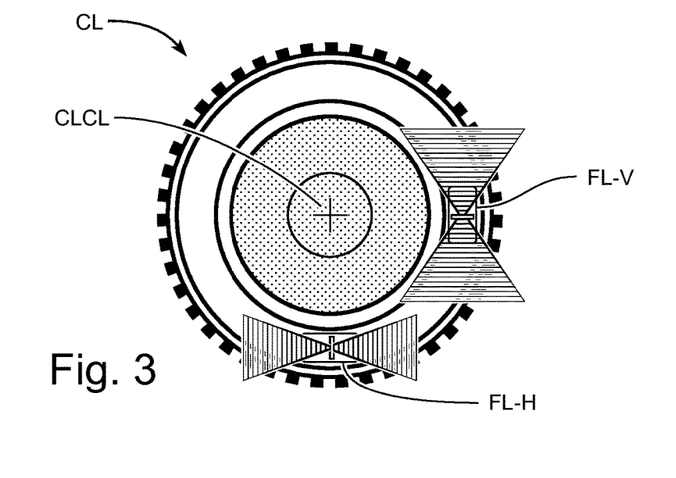
Figure 4:
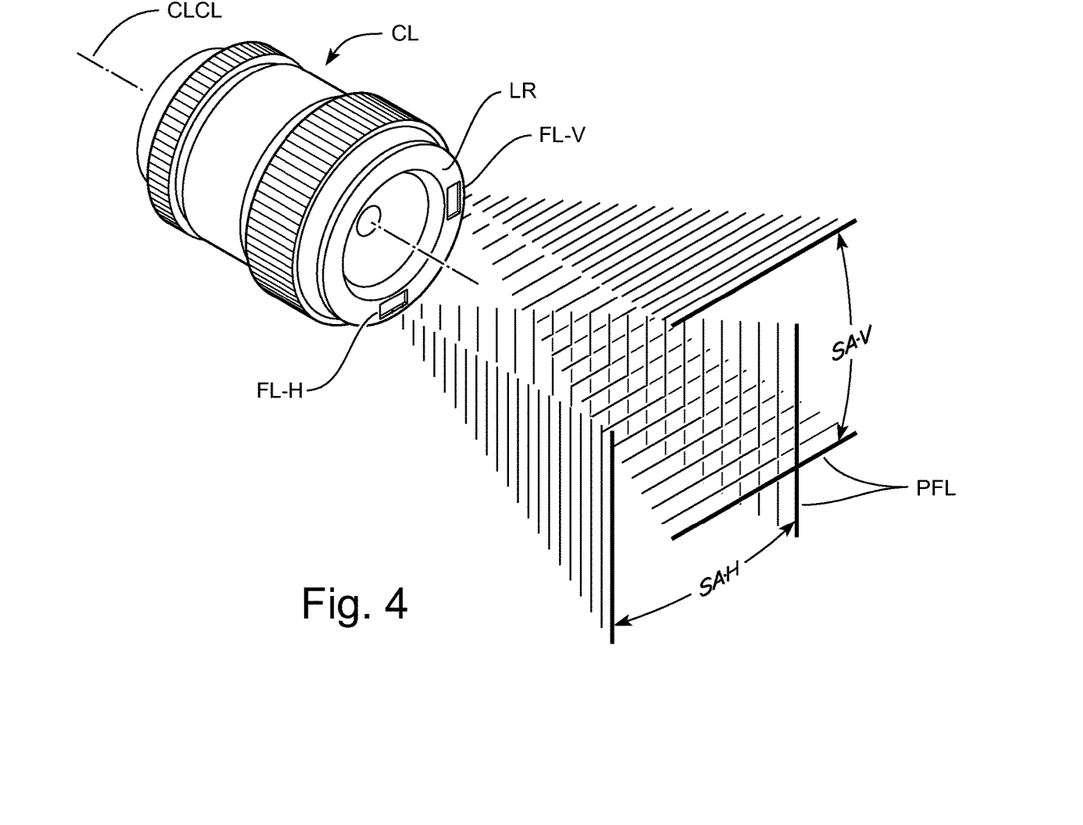
Figure 5A:
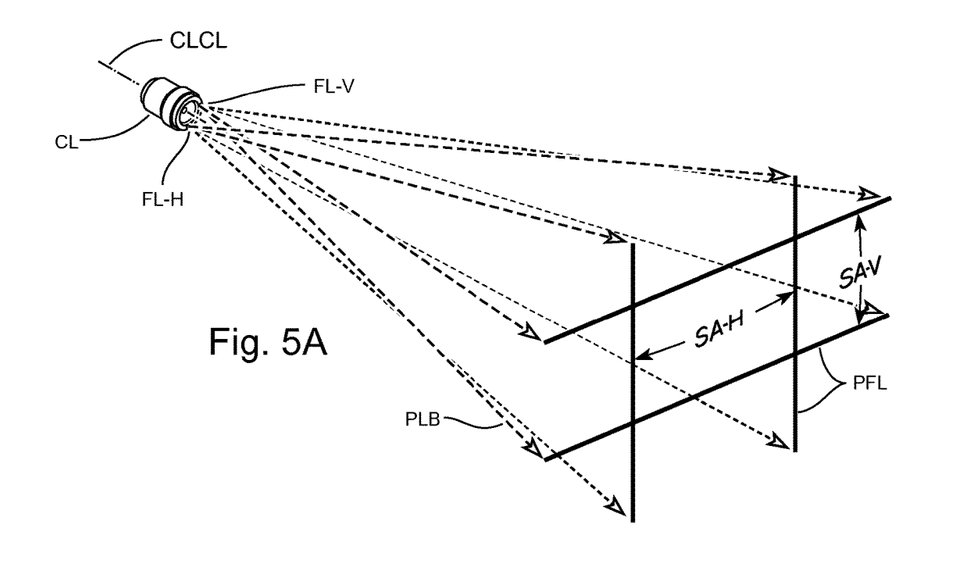
FIGS. 5A and 5B illustrate horizontal and vertical framing lines from FIG. 4 extended in their projection with different spread angles.
Figure 5B:
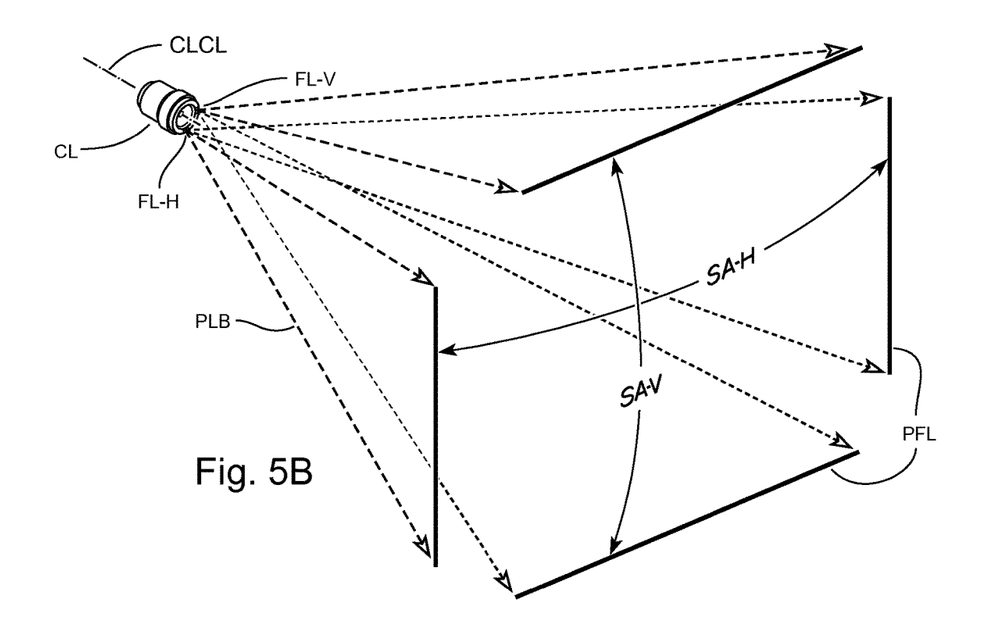

Initially, FIG. 1 illustrates the concept of a framing light assembly FLA that optically projects a line of light toward a beamsplitter BS which both transmits that line of light TL and reflects a line of light RL. A single framing light assembly will generate two projected framing lines PFL in either a horizontal or vertical orientation, depending upon the orientation of the framing light assembly relative to the camera. The framing light assembly of FIGS. 2A and 2B includes a laser that can be swung around a laser pivot LP and stationary beam splitter BS to project two lines of light having a spread angle SA (which is split in its middle by the framing light assembly center line FLCL) twice that of the laser adjustment angle LAA.

FIGS. 3, 4, 5A and 5B illustrate use of two framing light assemblies FLA-H and FLA-V (which have, respectively, horizontal and vertical orientations) which are integrated into the rim of a camera lens barrel. The projection distance is the same in FIGS. 5A and 5B, the only difference between the two figures being that the spread angle is different.

Figure 6:
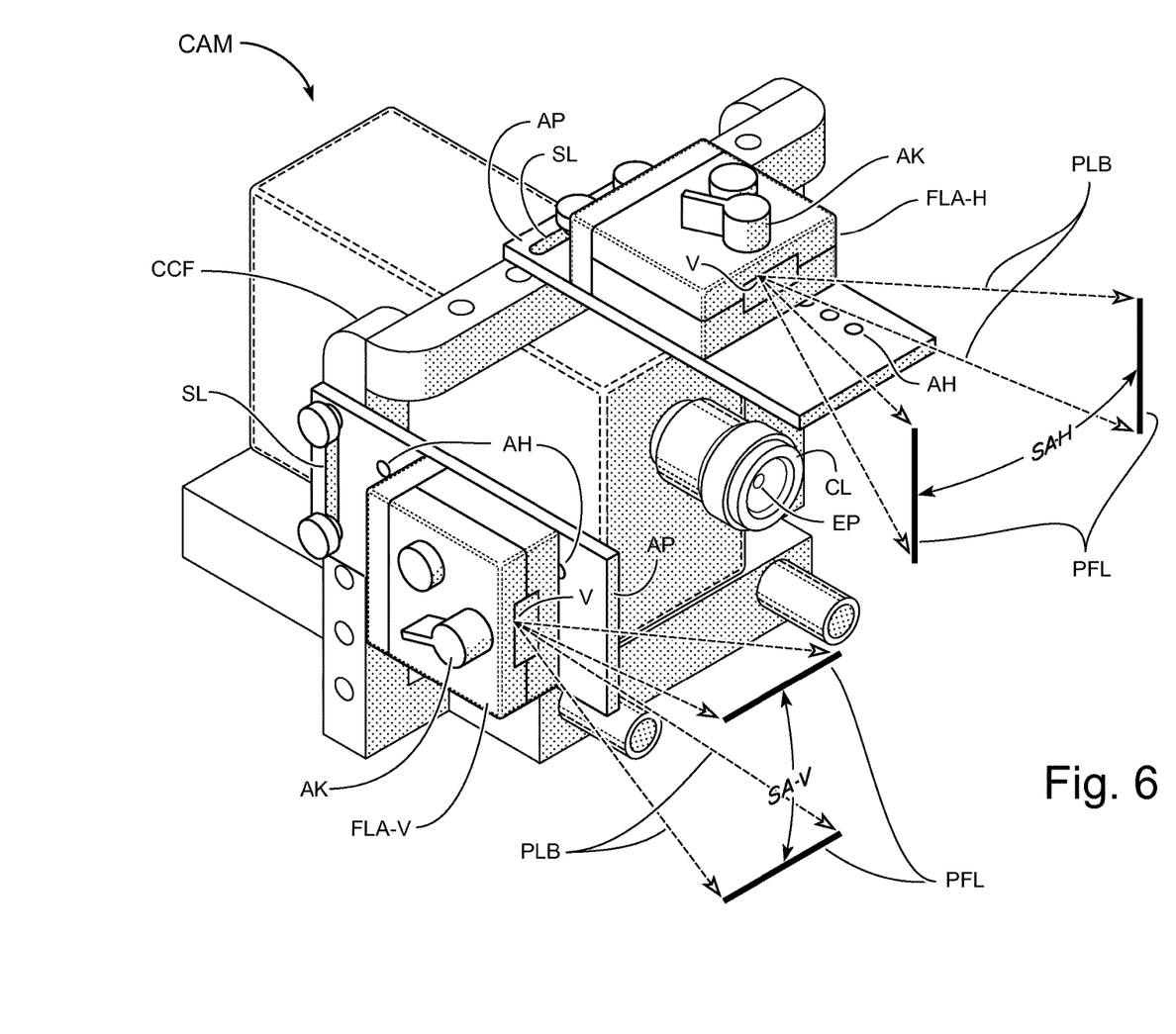
FIG. 6 illustrates vertical and horizontal framing light assemblies mounted above and beside a camera lens in accordance with the present invention.

FIG. 6 illustrates how framing light assemblies which can be sold or rented to the professional motion-picture and video industry, can be attached to a camera cage frame CCF. Attachment holes AH in adapter plate AP allow longitudinal positional adjustment of framing light assemblies. Slots SL in the rear of each adapter plate provide lateral adjustment of the adapter plates relative to the camera cage frame CCF. A camera operator manually adjusts the horizontal and vertical spread angles, SA-H and SA-V, respectively, of the accessory framing light assemblies to match the camera's field of view using the camera's viewfinder, not shown, using angle-adjustment knobs AK. The adapter plates AP provide 2-axis adjustment (longitudinal and orthogonal) to position the vertex V (of projected light beam PLB and reflected light beam RLB) adjacent to the entrance pupil EP of the camera lens CL. These orthogonal adjustments of the accessory framing light assemblies eliminate parallax error relative to the camera lens. The spread angles of the accessory framing lights are independently adjustable to match the fields of view of the majority of fixed-focal-length and zoom lenses. When the technique is engineered into interchangeable-lens type cameras, the camera body conveys the image aspect ratio to the framing light assembly FLA. This can be done with electrical contacts on the lens mount, not shown, or detected mechanically.

To prevent projected framing lines PFL from being photographed, while shooting with a motion-picture film camera, the light sources (typically line-generating laser diodes LD FIGS. 1 and 2A-B) can be pulsed to shine only during the dark interval between film frames. An alternate technique with any type of camera is to expand the projected spread angle SA to just beyond the camera len's field of view.

Figure 7:
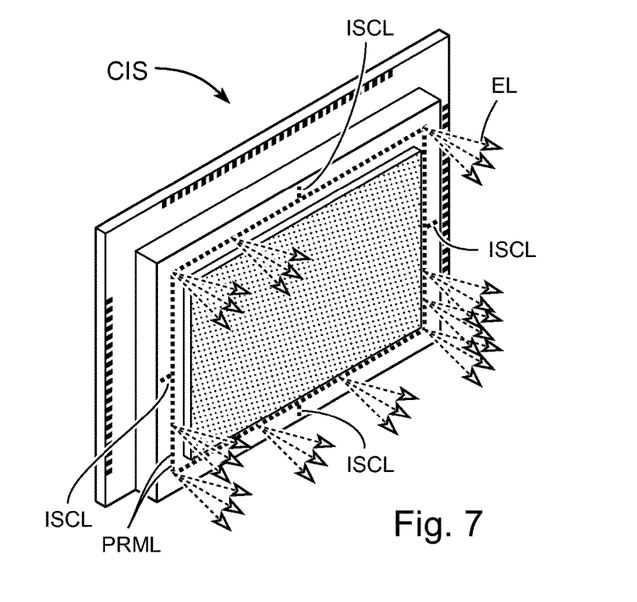
FIGS. 7 and 8 illustrate use of a perimeter light in accordance with the present invention.
Figure 8:
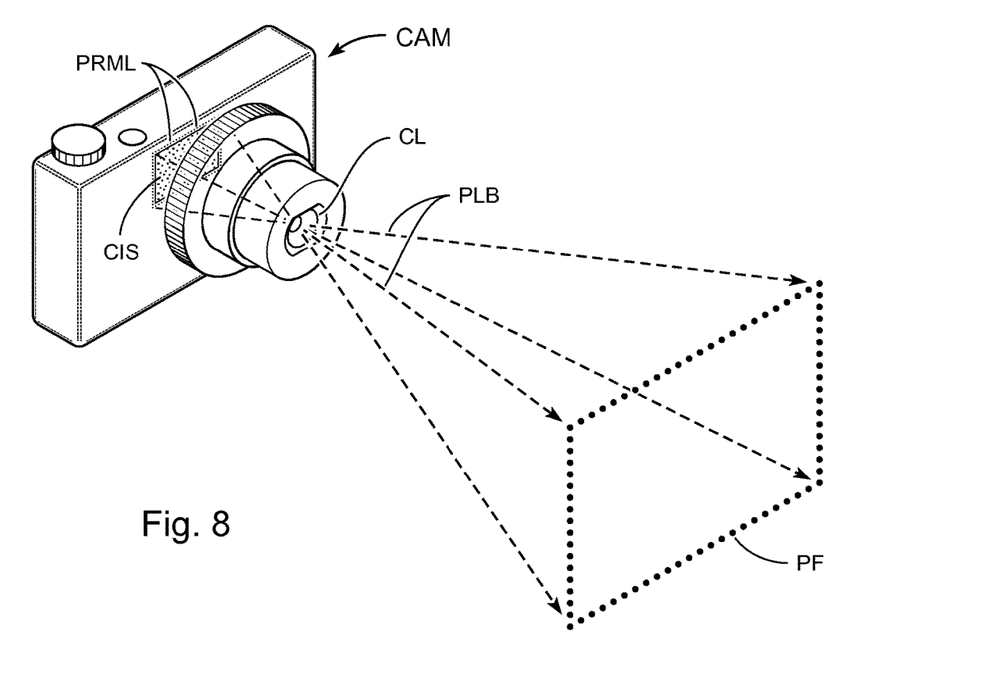

Parallax error discussed above can be eliminated by placing laser diodes LD or LED's around the perimeter of the camera's image sensor CIS, FIG. 7. In this concept, prior to the exposure, the camera is used as a projector and the framing lights project out through the camera taking lens CL, FIG. 8. This allows existing conventional lenses to be used on interchangeable-lens framing-light-enabled cameras. In FIG. 7, only a few of the many laser diodes LD that surround the camera image sensor CIS are shown lighted (indicated by arrows), to simplify the drawing. This technique can be designed into any format camera, including professional-film or digital still cameras, video cameras, pocket digital cameras, cell-phone cameras, and police body cameras. The lights surrounding the camera image sensor CIS project out through the camera lens CL at a just slightly wider angle than the sensor will "see." Just prior to exposure (taking the picture), the framing lights are turned off and the shutter is closed before starting the normal picture-taking sequence.

As an optional increased function, because lenses cover an image diameter equal to the diagonal of the camera image sensor CIS, there is room within the field of view of the camera lens CL to include reference marks for the vertical and horizontal center lines ISCL, FIG. 7, of possible use to professional photographers to level the camera or to center a photographic subject within the frame.

Figure 9:
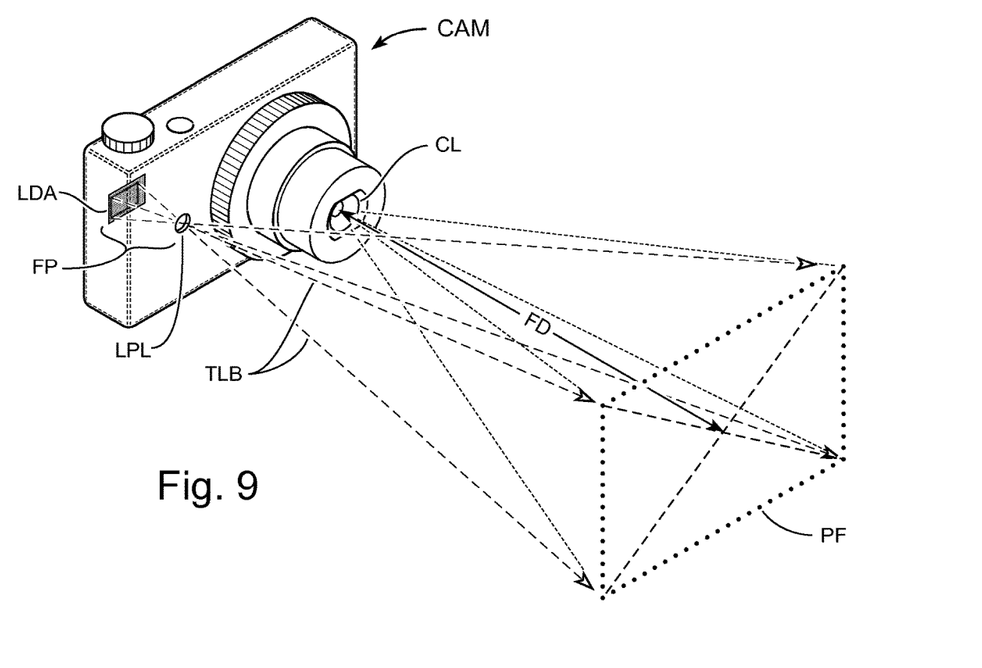
FIG. 9 illustrates the use of a framing light in accordance with the present invention that is built into a camera and set apart from the camera's optical path which optically projects frame edges which can have varying aspect ratios as illustrated in FIGS. 10A-10E.

An alternate version which is more suitable for cameras that accept existing interchangeable lenses is shown in FIG. 9. This is a solid-state version with no moving parts in the framing projector FP and provides high reliability. In this version, illustrated in FIGS. 9 and 10A-E, a laser-diode array LDA is used behind a dedicated laser projection lens LPL in the camera CAM to project the frame F made of lighted laser diodes into the scene. The camera illuminates a rectangle of laser diodes LD which become lighted laser diodes LLD on the laser-diode array LDA FIGS. 10A-E, the size and shape of which are determined by:

(1) the image aspect ratio, and
(2) the field of view of the camera taking lens CL (which is determined by the size of the active area of the camera's image sensor CIS, and the focal length of the camera taking lens).

This version has the further advantage that parallax error of the projected frame PF can be eliminated by using the camera's focus distance FD, and the displacement of the framing projector FP from the camera taking lens, FIG. 9. This causes the rectangle of lighted laser diodes to shift position on the laser-diode array LDA, so that the projected frame PF is centered on the subject at the focus distance FD of the camera taking lens.

Figure 10A:
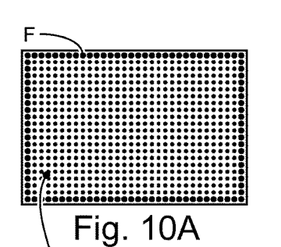
Figure 10B:
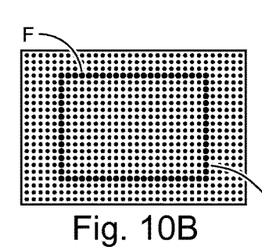
Figure 10C:
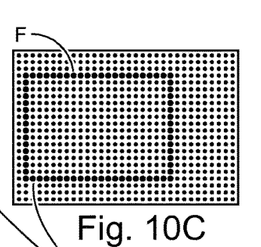
Figure 10D:
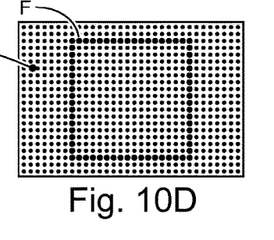
Figure 10E:
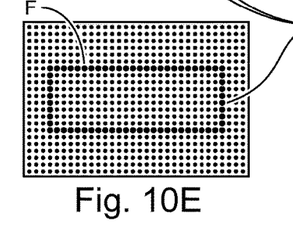

The size and shape of the rectangle made of lighted laser diodes on the laser-diode array LDA adjusts according to the image aspect ratio chosen by the photographer, the lens field of view, and the focus distance. FIGS. 10A-E illustrate the size and shape of lighted diodes on the array for:

FIG. 10A, wide angle.
FIG. 10B, telephoto.
FIG. 10C, telephoto of FIG. 10B, but with parallax compensation for close focus.
FIG. 10D, square aspect ratio for Instagram® and other social-media apps.
FIG. 10E, panorama.

It is worth noting that while it is especially desirable that horizontal and vertical framing-light assemblies work together, especially with respect to operations such as changing aspect ratio and correcting for parallax error, the detachable framing light assemblies are examples of framing lights which can also be operated independently of each other.

Although the following list is not meant to be limiting, the present disclosure includes the following concepts:

1. A photographic field-of-view framing device that eliminates the need for the photographer to remain behind the camera to compose a photograph.

2. A photographic framing device of concept 1 that allows the photographer to view the camera's field of view without having to view through the camera viewfinder.

3. A photographic framing device of concept 1 that allows the photographer to view the scene being photographed without having to view the camera display on the camera.

4. A field-of-view framing device of concept 1 that allows the photographer to go into the photographic space in front of the camera while getting a visual indication of the camera's field of view, to make required adjustments to the scene.

5. A field-of-view framing device of concept 1, in the form of internal light sources (laser diodes, LED's, etc.) that are integral to the camera and causes the camera operate as a projector prior to the exposure.

6. A field-of-view framing device of concept 5 where light sources are located adjacent to and at the corners of the camera sensor.

7. A field-of-view framing device of concept 5 where multiple light sources are arranged adjacent to and around the perimeter of the camera sensor.

8. A framing device of concept 5 which provides for the correct field of view as the camera lens zooms.

9. A framing device of concept 5 which projects the correct image aspect ratio.

10. A field-of-view framing device of concept 1 where the light sources in a motion picture camera can be pulsed to shine only during the dark interval between frames.

11. A field-of-view framing device of concept 1 which is integral to the camera body but separated from the camera lens, off to the side of the taking lens.

12. A field-of-view framing device of concept 11 in which the lens focal length, whether a prime or zoom lens, is sensed by the camera body and transmitted to the framing device to project the correct horizontal and vertical fields of view.

13. A field-of-view framing device of concept 1 which is integrated into the rim of the camera taking lens.

14. A framing device of concept 13 in which the sensor size and aspect ratio are sensed by the framing device in the lens rim to project the correct horizontal and vertical fields of view.

15. A field-of-view framing device of concept 1 which is an accessory to an existing camera.

16 A field-of-view framing accessory of concept 15 which is made of two identical devices, one to project the vertical field of view, the other the horizontal field of view.

17. A framing accessory of concept 15 which projects two opposite edges of the field of view with a single light source.

18. A framing accessory of concept 15 in which the angle of the reflected light beam exactly matches the opposite angle of the transmitted light beam, relative to the plane of the beamsplitter.

19. A framing accessory of concept 15 which projects two edges at equal and opposite angles relative to the beamsplitter, with a single angular adjustment of the light source (line laser).

20. A field-of-view framing accessory of concept 15 which uses a single angularly-adjustable light source (line laser) and optical beamsplitter, where the light beam simultaneously transmits and reflects off the beamsplitter at equal and opposite angles relative to the plane of the beamsplitter.

21. A field-of-view framing accessory of concept 15 which eliminates vertical parallax error by having the vertex of the reflected-and-transmitted light beams positioned (vertically and longitudinally aligned) beside the entrance pupil of the camera taking lens.

22. A field-of-view framing accessory of concept 15 which eliminates horizontal parallax error by having the vertex of the reflected-and-transmitted light beams positioned (laterally and longitudinally aligned) above or below the entrance pupil of the camera taking lens.

23. A field-of-view framing device of concept 1 which is solid state and avoids mechanical moving parts.

24. A field-of-view framing device of concept 23 which provides an area array of miniature light sources (LED's or laser diodes).

25. A field-of-view framing device of concept 23 with the ability to project a lighted rectangle to indicate the field of view of the camera taking lens.

26. A field-of-view framing device of concept 23 with the ability to change the aspect ratio of the lighted rectangle.

27. A field-of-view framing device of concept 23 with the ability to eliminate parallax error by shifting the position of the lighted rectangle, for close focusing of the camera.

Although the foregoing detailed description is illustrative of preferred embodiments of the present invention, it is to be understood that additional embodiments thereof will be obvious to those skilled in the art. Further modifications are also possible in alternative embodiments without departing from the inventive concepts.

Accordingly, it will be readily apparent to those skilled in the art that still further changes and modifications in the actual concepts described herein can readily be made without departing from the spirit and scope of the disclosed inventions.

What is claimed is:

1. An apparatus, comprising:
a horizontal framing-light assembly positioned relative to a camera lens of a camera which projects two opposite vertical framing lines of a projected frame with a first single light source; and
a vertical framing-light assembly positioned relative to a camera lens of a camera which projects two opposite horizontal framing lines of a projected frame with a second single light source;
wherein the projected frame is defined by the two opposite horizontal framing lines and the two opposite vertical framing lines and the projected frame is positioned relative to a field of view of the camera lens.

2. The apparatus of claim 1, wherein the projected frame is positioned proximate to, but outside of, the field of view of the camera lens.

3. The apparatus of claim 1, wherein the horizontal framing-light assembly and the vertical framing-light assembly are integral with a body of the camera but separated from, and off to the side of, the camera lens.

4. The apparatus of claim 3, wherein the lens focal length is sensed by the body and transmitted to the horizontal and vertical framing-light assemblies to adjust the projected frame to the field of view of the camera lens.

5. The apparatus of claim 1, wherein each of the horizontal and the vertical framing-light assemblies is further comprised of a beamsplitter, a line emitting laser diode and an angular adjustment which adjusts a spread angle by swinging the light emitting laser diode around a beamsplitter while the beamsplitter is stationary.

6. The apparatus of claim 5, wherein each of the horizontal and the vertical framing-light assemblies projects two framing lines at equal and opposite angles relative to the beamsplitter and the angular adjustment is a single angular adjustment.

7. The apparatus of claim 6, wherein each of the horizontal and the vertical framing-light assemblies can be detachably connected to a body of the camera.

8. The apparatus of claim 7, wherein the horizontal framing-light assembly eliminates horizontal parallax error by having a vertex of the two opposite horizontal framing lines positioned above or below an entrance pupil of the camera lens.

9. The apparatus of claim 8, wherein the vertical framing-light assembly eliminates vertical parallax error by having a vertex of the two opposite horizontal framing lines positioned beside the entrance pupil of the camera lens.

10. The apparatus of claim 7, wherein the horizontal framing-light assembly eliminates horizontal parallax error by having a vertex of the two opposite vertical framing lines positioned above or below an entrance pupil of the camera lens.

11. The apparatus of claim 7, wherein the horizontal and the vertical framing-light assemblies have the ability to independently change an aspect ratio of the projected frame.

12. The apparatus of claim 11, wherein the camera's aspect ratio is transmitted to the horizontal and vertical framing-light assemblies to adjust the aspect ratio of the projected frame.

13. The apparatus of claim 2, wherein the horizontal and the vertical framing-light assemblies have the ability to independently change an aspect ratio of the projected frame.

14. The apparatus of claim 13, wherein an aspect ratio of the camera lens is sensed by the body and transmitted to the horizontal and vertical framing light assemblies to adjust the aspect ratio of the projected frame.

15. A camera with a framing projector built into the camera, comprising: a perimeter framing light located proximate to a camera image sensor, wherein the framing light causes the camera to operate as a projector prior to a light exposure to create a projected frame based upon a field of view of the camera for the light exposure.

16. The camera of claim 15, wherein the perimeter framing light provides for a correct field of view as a camera lens zooms.

17. The camera of claim 15, wherein the projected frame has an image aspect ratio identical to that of the light exposure.

18. A method, comprising:
projecting a frame from a horizontal framing-light assembly and a vertical framing-light assembly positioned relative to a camera lens of a camera used to take a light exposure, wherein each of the horizontal and vertical framing-light assemblies projects two opposite framing lines by use of a beamsplitter in which the angle of a reflected light beam exactly matches the opposite angle of the transmitted light beam, relative to the plane of the beamsplitter.

19. The method of claim 18, wherein an aspect ratio of the projected frame is adjusted to coincide with an aspect ratio of the camera lens for the light exposure.

* * * * *